No. 874,176. PATENTED DEC. 17, 1907.
C. A. FISCHER.
ADJUSTABLE FEED CARRIAGE FOR LATHES.
APPLICATION FILED FEB. 9, 1906.
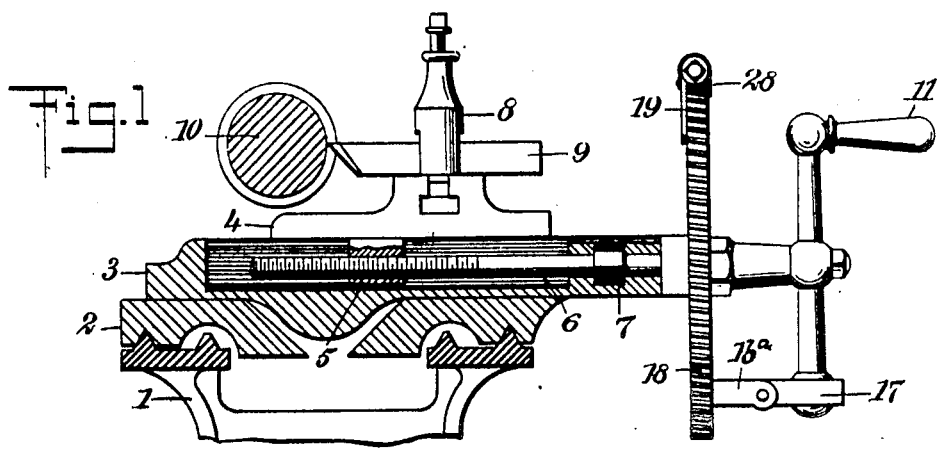
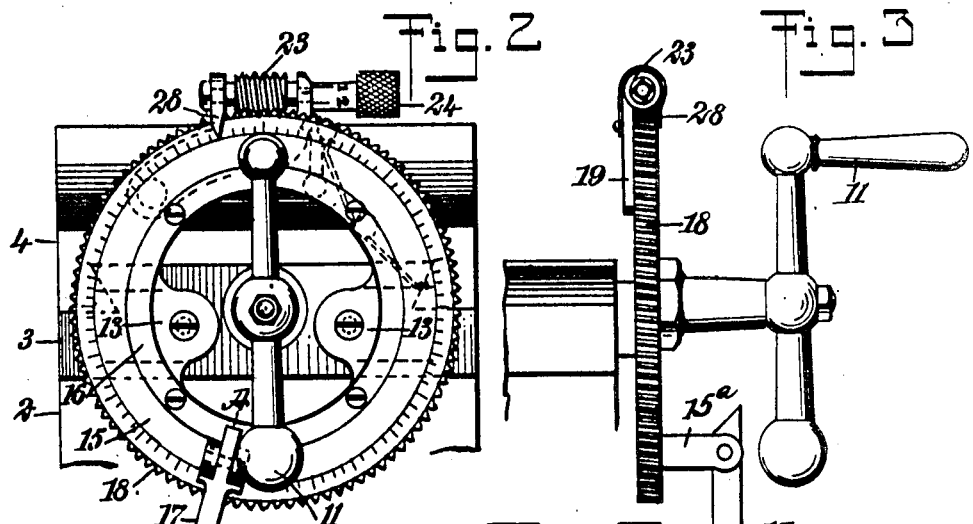
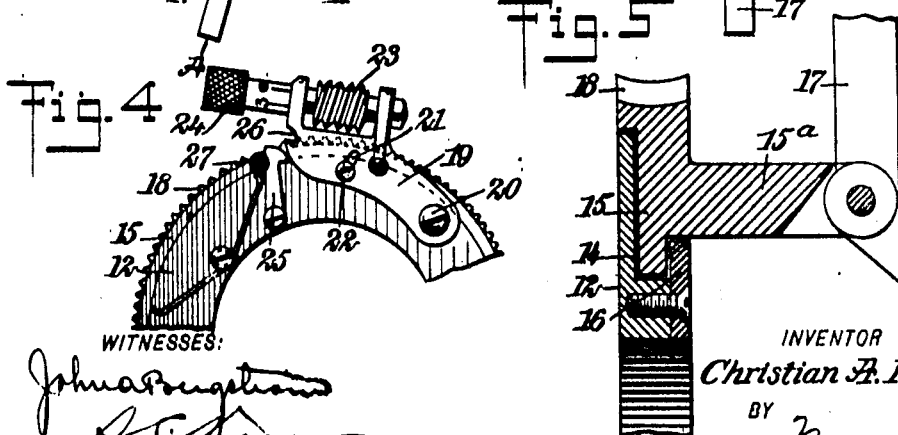
WITNESSES:
INVENTOR
*Christian A. Fischer*
BY
*Munn & Co*
ATTORNEYS

UNITED STATES PATENT OFFICE.

CHRISTIAN ALBERT FISCHER, OF GRAND FORKS, NORTH DAKOTA.

ADJUSTABLE FEED-CARRIAGE FOR LATHES.

No. 874,176.   Specification of Letters Patent.   Patented Dec. 17, 1907.

Application filed February 9, 1906. Serial No. 300,258.

*To all whom it may concern:*

Be it known that I, CHRISTIAN ALBERT FISCHER, a citizen of the United States, and resident of Grand Forks, in the county of Grand Forks and State of North Dakota, have invented a new and Improved Adjustable Feed-Carriage for Lathes, of which the following is a full, clear, and exact description.

My invention contemplates certain new and useful improvements in means for governing the movement of the cross feed screw of tool slides for carriages of metal-turning lathes in which a definite and predetermined amount of feed is obtained for any cutting tool.

The object of my invention is a device of this character which will be capable of adjusting the cross feed with such a nicety, that objects may be turned or threads cut therein with mathematical exactness.

A further object of my invention is a device of this character which is simple and reliable and which may be easily applied to the ordinary forms or types of hand feeding lathes and screw-cutting machines and one that will be available where it is desired to turn several different sizes on one piece of metal, or where threads of different depths are to be cut. The device is also well adapted for repair work, when a thread is to be cut and fitted for one part only.

With this and other objects in view as will more fully appear as the description proceeds, the invention consists in certain constructions, arrangements, and combinations of the parts hereinafter fully described and claimed, reference being had to the accompanying drawing in which:

Figure 1 is a longitudinal sectional view of a lathe carriage embodying the improvements of my invention, certain of the parts being shown in elevation; Fig. 2 is an end elevation of the cross feed operating and regulating mechanism; Fig. 3 is a side elevation of the same taken at right angles to the view shown in Fig. 2; Fig. 4 is a fragmentary detail showing the reverse side of a part of the mechanism shown in Fig. 2, and Fig. 5 is an enlarged sectional view taken on the line A—A of Fig. 2.

Corresponding and like parts are referred to in the following description and indicated in all the views of the drawings by the same reference characters.

Referring to the drawing, the numeral 1 designates the frame of a lathe provided with the usual ways, upon which the carriage 2 slides. The carriage is here shown as provided with a top section 3 upon which the tool slide 4 is mounted. The slide 4 is formed with a depending lug 5 in which the cross screw 6 works, said screw being journaled in the section 3 of the carriage as indicated at 7. The tool slide 4 supports a tool post 8 in which a tool 9 is mounted so as to turn or cut a piece of work 10. The cross feed screw 6 is provided at one end with a crank for its actuation, said crank being provided with a handle 11 so that the screw may be readily turned and controlled.

Secured to the carriage by means of screws or similar fastening means, as best shown in Fig. 2, is a metallic ring or disk 12, which may be provided with suitable attaching lugs 13. Against the outer face of the ring or disk 12 another ring 16 is held by means of screws, as best seen in Fig. 5, and between these two rings, a circular track 14 is formed. Mounted within the track 14 and adapted to freely rotate around the ring 12 is another ring 15 which is provided with a forwardly extended arm 15ª carrying at its outer end a pivoted finger 17. The said finger 17 is adapted to be swung outwardly across the path of movement of the crank of the cross feed screw 6 as illustrated in Fig. 1, and is also adapted to be swung backwardly and assume an angular position with respect to its arm 15ª, as shown in Figs. 2, 3 and 5, out of the path of the said crank.

The periphery of the ring 15 is provided with worm gear teeth 18, and the ring or disk 12 constitutes a support, not only for the ring 15, but also for a bracket 19 which is pivoted to the said ring 12 at one end as indicated at 20 and which is limited in its pivotal movement by means of a slot 21 and a screw 22 working therein. Journaled in two extensions of the bracket 19 is a micrometer worm 23, which meshes with the gear 18 when the bracket 19 is depressed to the position shown in Fig. 2, but which is free from such meshing engagement when the said bracket is raised to the position shown in Fig. 4. The micrometer worm 23 is provided with a scale as shown, if desired, and a thumb-operating head 24. The bracket 19 is adapted to maintain the worm gear in mesh with the gear 18 by any convenient means, and for this purpose I have shown in the present instance the ring 12 provided with a spring-pressed catch 25 which coöperates with the bracket 19 by means of a notch 26 formed in the latter. The catch 25 is preferably provided with a convenient releasing means, such as the roughened surface 27. That end of the bracket 19 which is formed with a notch, is beveled as best seen in Fig. 4, and it is therefore evident that the spring of the catch 25, when the latter has become disengaged from the notch 26 will cause the said catch to ride upon its beveled surface and move the bracket upwardly or outwardly and support it in its outward position. The bracket 19 may be provided with a pointer 28, which shows the degree of rotation on a circular scale marked on the ring 15, as shown in Fig. 2.

In the practical operation of my improved device, the tool is first properly placed in the tool post, while the bracket 19 is raised to the position shown in Fig. 4, so that the worm may be out of mesh with the gear 18 and the finger 17 extended as shown in Fig. 1. The tool 9 is now fed in on the work 10 by the crank, operated by the handle in the usual manner, until the desired cut is obtained, the said cut being determined by any hand gage, such as the common calipers. As the crank is turned to feed the tool, the finger 17 being in contact therewith will manifestly rotate the ring 15, and when the desired depth of cut has been determined, the bracket 19 is depressed and the catch 25 will thereupon lock the worm 23 in mesh with the gear 18. Any further feed of the tool must be made by rotating the micrometer worm 23 as is obvious that the crank is prevented from turning in a direction to feed the screw owing to its engagement with the finger 17, and also to the further fact that the ring 15 can not be turned so long as it is locked from movement by the worm 23, except by turning the worm 23 itself. Hence any further feed of the tool must be made by rotating the micrometer worm 23, and it is obvious that this worm may be turned to allow the feed to be turned a very small fraction of an inch, the crank being turned to effect this nice adjustment and until it is brought up against the finger 17 and the latter is in its final exact position. It is clear that the crank may now be rotated away from the article being turned or cut and rotated back to exactly the same predetermined position, when any new work is inserted. To change the desired amount of feed, the catch 25 is moved out of engagement with the bracket 19, and a new amount of feed easily adjusted in the same manner as described above.

The amount of rotation of the ring 15, and consequently the amount of feed, may be measured in cases of ordinary exactness on the scale of said ring; but where the greatest amount of exactness is required, the feed is finally measured by the micrometer gage, as will be readily understood.

Having thus described my invention I claim as new and desire to secure by Letters Patent:

1. The combination of a feed carriage for lathes, a tool slide laterally adjustable on said carriage, a cross feed screw adapted to effect the lateral movement of said tool slide and provided with means for turning the screw, a ring revolubly mounted upon the carriage and provided with a worm periphery, means carried by said ring for limiting the movement of the screw in one direction, a micrometer worm also supported by said carriage and arranged to be moved into and out of meshing engagement with the worm gear of said ring, and means for locking said worm in engagement with said worm gear.

2. The combination of a feed carriage for lathes, a tool slide laterally adjustable on said carriage, a cross feed screw adapted to effect the lateral movement of said tool slide and provided with means for turning the screw, a ring revolubly mounted upon the carriage and provided with a worm periphery, means carried by said ring for limiting the movement of the screw in one direction, and a micrometer worm also supported by said carriage and arranged to be moved into and out of meshing engagement with the worm gear of said ring.

3. The combination of a feed carriage for lathes, a tool slide laterally adjustable on said carriage, a cross feed screw adapted to effect the lateral movement of said tool slide and provided with an actuating crank, a ring revolubly mounted upon the carriage and provided with a worm periphery, a finger carried by said ring and adapted to project out into the path of movement of said crank, a micrometer worm also supported by said carriage and arranged for meshing engagement with the worm gear of said ring, and means for locking said worm in engagement with said worm gear and for also holding said worm out of said engagement.

4. The combination of a feed carriage for lathes, a tool slide laterally detachable thereon, a cross feed screw adapted to effect the lateral movement of said tool slide and provided with an actuating crank, a supporting ring secured to said carriage, another ring mounted to turn about said supporting ring and provided with an arm projecting forwardly from its outer face, a pivoted finger carried by said arm and adapted to be swung into the path of movement of the said crank, the said ring being provided with a worm gear, a bracket pivotally mounted on said supporting ring, a micrometer worm journaled in said bracket and adapted to engage the said worm gear, and means engaging with the bracket, for locking the said worm in engagement with the said worm gear.

5. In a tool feed mechanism for lathes, the combination with a revoluble member provided with a worm gear periphery and a support for said member, of a pivoted bracket mounted on the support a micrometer worm journaled in said bracket and adapted to engage the worm gear, the bracket being formed at its free end with a notch and a beveled surface below said notch, and a spring pressed catch formed with a hooked end, adapted to enter said notch to lock the worm in engagement with the worm gear, said hooked end being provided with a beveled outer surface adapted to engage the outer surface of the bracket whereby to support the bracket with the worm out of engagement with the gear.

6. In a tool feed mechanism for lathes, the combination with a revoluble member provided with a worm gear periphery and a support for said member, of a bracket pivotally mounted on the support and provided at its free end with a notch, a micrometer worm journaled in the free end of said bracket and arranged for engagement with the worm gear, and a spring pressed catch mounted on said support and adapted to enter the notch of the bracket, whereby to lock the said worm in engagement with the worm gear.

In testimony whereof I have signed my name to this specification in the presence of two subscribing witnesses.

CHRISTIAN ALBERT FISCHER.

Witnesses:
L. A. BENNETT,
F. B. ANDREWS.